US012688848B1

(12) United States Patent
Liu et al.

(10) Patent No.: US 12,688,848 B1
(45) Date of Patent: Jul. 21, 2026

(54) INTERACTION RESPONSE GUIDANCE

(71) Applicant: Wells Fargo Bank, N.A., San
Francisco, CA (US)

(72) Inventors: Zheng Liu, Charlotte, NC (US);
Xinran Shi, Duluth, GA (US); Ye Yu,
San Francisco, CA (US)

(73) Assignee: Wells Fargo Bank, N.A., San
Francisco, CA (US)

( * ) Notice: Subject to any disclaimer, the term of this
patent is extended or adjusted under 35
U.S.C. 154(b) by 97 days.

(21) Appl. No.: 18/433,173

(22) Filed: Feb. 5, 2024

(51) Int. Cl.
*G10L 15/18* (2013.01)
*G10L 15/183* (2013.01)
*G10L 15/22* (2006.01)

(52) U.S. Cl.
CPC ........ *G10L 15/1815* (2013.01); *G10L 15/183*
(2013.01); *G10L 15/22* (2013.01); *G10L
2015/225* (2013.01)

(58) Field of Classification Search
CPC ... G10L 15/1815; G10L 15/183; G10L 15/22;
G10L 2015/225
See application file for complete search history.

(56) References Cited

U.S. PATENT DOCUMENTS

| | | | |
|---|---|---|---|
| 7,813,951 | B2 | 10/2010 | Eskandari |
| 8,478,709 | B2 | 7/2013 | Tang et al. |
| 8,615,419 | B2 | 12/2013 | Eilam et al. |
| 8,825,514 | B2 | 9/2014 | Lawton et al. |
| 9,922,338 | B2 | 3/2018 | Ovick et al. |
| 10,051,122 | B2 | 8/2018 | Raanani et al. |
| 10,600,063 | B2 | 3/2020 | Bracher et al. |
| 10,645,219 | B1 | 5/2020 | Mackie et al. |
| 10,949,771 | B2 | 3/2021 | Gonguet et al. |
| 11,386,468 | B2 | 7/2022 | Tortoriello et al. |

(Continued)

FOREIGN PATENT DOCUMENTS

| | | |
|---|---|---|
| AU | 2019101197 A4 | 1/2020 |
| CN | 109285038 A | 1/2019 |

(Continued)

OTHER PUBLICATIONS

Hossain et al., "Large-scale Data-driven Segmentation of Banking
Customers", 2020 IEEE International Conference on Big Data (Big
Data), IEEE, Dec. 10, 2020, 4392-4401 pp.

(Continued)

*Primary Examiner* — Abul K Azad
(74) *Attorney, Agent, or Firm* — Shumaker & Sieffert,
P.A.

(57) ABSTRACT

This disclosure describes a computer information system or
computing system capable of analyzing communications
between computing devices. In one example, this disclosure
describes a method that includes identifying, based on text
derived from a message originating from a user device, a
topic associated with the message; generating, based on the
topic and the text derived from the message, one or more
productive expressions that, if communicated to the user
device, tend to encourage a desired outcome; generating,
based on the topic and the text derived from the message,
one or more unproductive expressions that, if communicated
to the user device, tend to discourage the desired outcome;
and outputting a user interface that presents the topic asso-
ciated with the message, the productive expressions, and the
unproductive expressions.

18 Claims, 9 Drawing Sheets

(56) References Cited

U.S. PATENT DOCUMENTS

| | | | |
|---|---|---|---|
| 11,537,506 B1 | 12/2022 | Dasgupta et al. | |
| 11,651,314 B1 | 5/2023 | Tuckfield et al. | |
| 11,868,380 B1 | 1/2024 | Pavlopoulou et al. | |
| 11,995,664 B2 | 5/2024 | Yoder et al. | |
| 12,368,805 B1 | 7/2025 | Cusati | |
| 12,374,327 B1* | 7/2025 | Tandon | G10L 15/22 |
| 2002/0052778 A1 | 5/2002 | Murphy et al. | |
| 2004/0024642 A1 | 2/2004 | Sidlo et al. | |
| 2008/0272188 A1 | 11/2008 | Keithley et al. | |
| 2009/0119176 A1 | 5/2009 | Johnson | |
| 2011/0029370 A1 | 2/2011 | Roeding et al. | |
| 2013/0282468 A1 | 10/2013 | Michael | |
| 2013/0282586 A1 | 10/2013 | Ovick et al. | |
| 2014/0067504 A1 | 3/2014 | Hammond et al. | |
| 2015/0019317 A1 | 1/2015 | Mitchell | |
| 2015/0032503 A1 | 1/2015 | Chander et al. | |
| 2015/0235230 A1 | 8/2015 | Ainsworth, III et al. | |
| 2016/0352902 A1 | 12/2016 | Raanani et al. | |
| 2017/0300923 A1 | 10/2017 | Arora et al. | |
| 2018/0225678 A1 | 8/2018 | MacIlwaine et al. | |
| 2018/0225739 A1 | 8/2018 | Shaw et al. | |
| 2019/0164080 A1 | 5/2019 | Stefani et al. | |
| 2019/0213511 A1 | 7/2019 | Higgins et al. | |
| 2019/0258903 A1 | 8/2019 | Foltz et al. | |
| 2020/0242513 A1 | 7/2020 | Blayvas et al. | |
| 2020/0302506 A1 | 9/2020 | Parker et al. | |
| 2021/0089979 A1 | 3/2021 | Beck et al. | |
| 2021/0295231 A1 | 9/2021 | Cmielowski et al. | |
| 2021/0319457 A1 | 10/2021 | Currier et al. | |
| 2021/0383416 A1 | 12/2021 | Treiser | |
| 2022/0405775 A1 | 12/2022 | Siebel et al. | |
| 2023/0032739 A1 | 2/2023 | De Jaegher et al. | |
| 2023/0064961 A1 | 3/2023 | Mahindru et al. | |
| 2023/0109001 A1 | 4/2023 | Goonetilleke | |
| 2023/0138753 A1 | 5/2023 | Riemer et al. | |
| 2023/0195607 A1 | 6/2023 | Sweeney | |
| 2023/0197069 A1* | 6/2023 | Houghton | G10L 15/183 |
| | | | 704/E15.005 |
| 2023/0214949 A1 | 7/2023 | Eidelman et al. | |
| 2023/0325684 A1 | 10/2023 | Vijayaraghavan et al. | |
| 2023/0334339 A1 | 10/2023 | Lowe | |
| 2023/0376160 A1* | 11/2023 | Heikkinen | G06F 3/167 |
| 2023/0410801 A1* | 12/2023 | Mishra | H04L 51/02 |
| 2024/0095491 A1* | 3/2024 | Birru | H04L 51/02 |
| 2024/0283868 A1* | 8/2024 | Ferris | G06F 40/253 |
| 2024/0412244 A1 | 12/2024 | Tietzen et al. | |

FOREIGN PATENT DOCUMENTS

| | | |
|---|---|---|
| CN | 110348914 A | 10/2019 |
| CN | 113052404 A | 6/2021 |
| CN | 113159787 A | 7/2021 |
| CN | 113723710 A | 11/2021 |
| CN | 114049159 A | 2/2022 |
| CN | 115375357 A | 11/2022 |
| CN | 115730947 A | 3/2023 |
| IN | 202111057174 A | 12/2021 |
| WO | 2022136692 A1 | 12/2021 |

OTHER PUBLICATIONS

Mousaeirad, "Intelligent Vector-based Customer Segmentation in the Banking Industry", arXiv:2012.11876v1, Dec. 22, 2020, 41 pp.

Dash et al. et al., "Customer attrition analytics in banking", International Journal of Business Analytics and Intelligence, vol. 5, No. 2, Oct. 2017, 7-14 pp.

Hassan et al., "Churn Prediction in Banking Sector using Bayesian Neural Networks", International Journal of Research in Advent Technology, vol. 6, No. 12, Dec. 2018, 4 pp.

Hegde et al., "Enhanced Deep Feed Forward Neural Network Model for the Customer Attrition Analysis in Banking Sector", International Journal of Intelligent Systems and Applications, vol. 11, No. 7, Jul. 8, 2019, pp. 10-19.

Hu, "A Data Mining Approach for Retailing Bank Customer Attrition Analysis", Applied Intelligence, vol. 22, Jan. 2005, pp. 47-60.

Kumar et al., "A Case Study of Customer Relationship Management using Data Mining Techniques", International Journal of Technological Exploration and Learning (IJTEL), vol. 2, No. 6, Dec. 2013, pp. 275-280.

Rahman et al., "Machine Learning Based Customer Churn Prediction in Banking", 2020 4th International Conference on Electronics, Communication and Aerospace Technology (ICECA), Nov. 5, 2020, pp. 1196-1201.

Thivakaran et al., "Clustering Customer Predictive Analytics Towards Managing the Customer Rating Complaints in Customer Management System", Journal of Data Acquisition and Processing, vol. 38, No. 2, Sep. 2023, 11 pp.

U.S. Appl. No. 18/588,692, filed Feb. 27, 2024, naming inventors Kudeti et al.

U.S. Appl. No. 18/594,961, filed Mar. 4, 2024, naming inventors Li et al.

Vo et al., "Leveraging Unstructured Call Log Data for Customer Churn Prediction", Knowledge-Based Systems, vol. 212, Jan. 5, 2021, 21 pp.

* cited by examiner

_172_

| TOPIC CONTENT | NOT DO | DO |
|---|---|---|
| 0.153* "loan" + 0.121* "appli" | ['consult','notifi decis','updat soon'] | ['applic current','soon decis','team'] |
| 0.176* "account" + 0.103* "close" | ['sorri','close','reason'] | ['issu','thank','transfer'] |
| ⋮ | ⋮ | ⋮ |
| 0.195* "fee" + 0.123* "charg" | ['new','limit','understand frustrat'] | ['issu','help','review'] |

FIG. 2D

INTERACTION RESPONSE GUIDANCE

TECHNICAL FIELD

The disclosure relates to computer-based systems for analyzing text, including analyzing text based on communications between computer information systems or computing systems.

BACKGROUND

Customer attrition is an important metric for many industries, including the banking industry, as it can result in the loss of revenue and reputation. Accordingly, customer attrition (e.g., following a bank's interaction with a customer) is an example of an undesirable outcome that may occur from the perspective of any business, including a bank. While businesses may have access to vast amounts of customer account information, it may be difficult to leverage this data effectively to identify potential causes of customer churn and determine proactive measures that can retain customers.

SUMMARY

In general, this disclosure describes a computer information system or computing system capable of analyzing communications between computing devices, such as an agent device operated by an agent of a bank and a user or customer device operated by a customer of the bank. In addition to analyzing the communications, the computer information system may be capable of predicting, based on the communications, whether a desired outcome will occur. In some examples, the computer information system may be capable of generating or predicting topic-based agent response recommendations that include, for example, a list of expressions that, if expressed by the bank agent, tend to result in achieving the desired outcome. The computer information system may also be capable of generating a list of other potential bank agent responses that tend to result in not achieving the desired outcome. The computer information system may use these lists to create and present user interfaces that guide responses to live and/or contemporaneous customer inquiries.

Techniques described herein may involve analyzing historical or live customer data. Systems described herein employ machine learning architectures that may include natural language models, classification models, recommender models, deep learning models, or other models. In some examples, the systems described herein may employ a deep learning model to predict, based on a customer message and an agent response, whether a particular outcome will occur (e.g., customer attrition). Systems may also employ one or more other models to provide additional feedback about communications between an agent device and a customer device. Predictions and feedback may be used to further provide guidance to an agent, but can also be used in other ways, including but not limited to affecting network operations, identifying weaknesses in banking operations or processes, verifying model training effectiveness, and/or forming the basis for various studies that may provide additional insights into interactions occurring over a network between an agent device and a customer device. In addition to the various other improvements and/or advancements described herein, the described systems provide an improved customer experience in which customer concerns and dissatisfaction may be more efficiently and immediately addressed and resolved to provide a more satisfactory banking experience that meets and exceeds the expectations of the customer.

In some examples, this disclosure describes operations performed by a computer information system or computing system in accordance with one or more aspects of this disclosure. In one specific example, this disclosure describes a method comprising identifying, by a system and based on text derived from a message originating from a user device, a topic associated with the message, wherein the topic is identified from a plurality of topics; generating, by the system and based on the topic and the text derived from the message, one or more productive expressions that, if communicated to the user device, tend to encourage a desired outcome; generating, by the system and based on the topic and the text derived from the message, one or more unproductive expressions that, if communicated to the user device, tend to discourage the desired outcome; and outputting, by the system, a user interface that presents the topic associated with the message, the productive expressions, and the unproductive expressions.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a system to carry out operations described herein.

The details of one or more examples are set forth in the accompanying drawings and the description below. Other features, objects, and advantages will be apparent from the description and drawings, and from the claims.

BRIEF DESCRIPTION OF DRAWINGS

FIG. 2D illustrates an example do/not do recommendation chart illustrating possible example "do/not do" expressions or recommendations associated with various topics, in accordance with one or more aspects of the present disclosure.

DETAILED DESCRIPTION

This disclosure describes techniques for analyzing interactions between computing devices, where the interactions represent communications between users operating the computing devices. Although described herein primarily in the context of a bank agent (operating an agent computing device) communicating with a user or banking customer (operating a customer computing device), techniques described herein apply to any agent and/or customer commercial interactions, or even to any user-to-user interaction generally, outside of a commercial context. Further, although a primary use case described herein involves generating topic-based response recommendations for use in responding to bank customer inquiries-particularly to reduce the likelihood of bank customer attrition-techniques described herein may apply to other use cases in the banking context (e.g., generating topic-based recommendations for providing technical support, for selling related or additional products or services, for reducing fraud, or for other purposes). In addition to the various other improvements and/or advancements described herein, the described systems and techniques provide an improved customer experience in which customer concerns and dissatisfaction may be more efficiently and immediately addressed and resolved to provide a more satisfactory banking experience that meets and exceeds the expectations of the customer.

Figure 1:
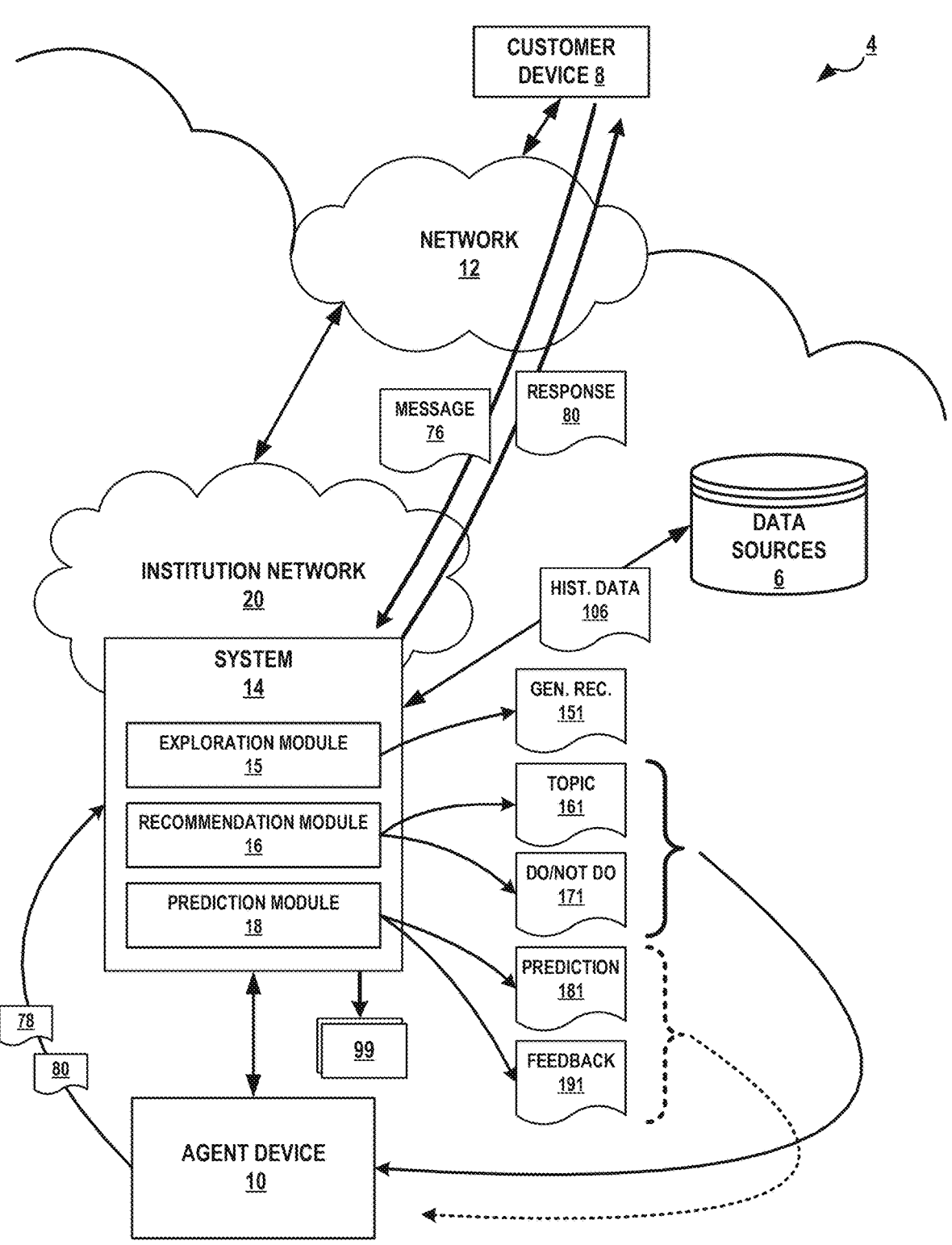
FIG. 1 is a conceptual diagram of an example system that analyzes communications and presents response guidance at an agent device, in accordance with one or more aspects of the present disclosure.

FIG. 1 is a conceptual diagram of an example system that analyzes communications and presents response guidance at an agent device, in accordance with one or more aspects of the present disclosure. As shown in the example of FIG. 1, network system 4 includes user device or customer device 8, network 12, institution network 20, computer information system 14, customer service representative device 10, and data sources 6. Although primarily described as a "customer device," device 8 illustrated and described herein may be referred to as a "user device."

Computer information system 14 may be physically or logically located within institution network 20 and may be accessible by customer service representative device 10 via institution network 20 and customer device 8 via network 12. In some examples, computer information system 14 may be configured to receive and process messages from one or more customer devices 8, where such message may be in the form of email, text, voice or audio messages (e.g., live audio communications), or any other appropriate form. Typically, such messages are received from one or more customer devices (such as customer device 8) that are operated by one or more users who may be customers (or in some examples, non-customers) of a business, bank, financial institution, or other organization that owns, controls, and/or operates institution network 20. In some cases, computer information system 14 may be part of a contact center or a call center such an organization, and may be accessible by and/or in communication with one or more customer service representative devices (such as customer service representative device 10) operated by one or more agents or customer service representatives for the business or institution. As often described herein, computer information system 14 may be configured to process customer service messages or queries pertaining to a bank or financial institution (e.g., queries related to servicing existing accounts, opening new accounts, closing existing accounts, etc.).

Customer device 8 and customer service representative device 10 may each comprise any of a wide range of user devices, including laptop or desktop computers, tablet computers, conventional or landline phones, so-called "smart" phones, "smart" pads, "smart" watches, Internet of Things (IoT) devices, or other personal digital appliances equipped for wired or wireless communication. In some examples, customer device 8 and/or customer service representative device 10 may comprise a device capable of communicating over a telecom network. In some examples, customer device 8 and/or customer service representative device 10 may support communication services over packet-switched networks, e.g., the public Internet, including Voice over Internet Protocol (VOIP). In some examples, customer device 8 and/or customer service representative device 10 may also support communication services over circuit-switched networks, e.g., the public switched telephone network (PSTN).

Each of customer device 8 and customer service representative device 10 typically include at least one user interface device (not shown) that enables a user of the respective computing device to interact with the computing device. In some examples, the user interface device(s) of customer device 8 and/or customer service representative device 10 may be configured to receive or produce tactile, audio, or visual input or output. In at least some examples, the user interface device(s) of customer device 8 and/or customer service representative device 10 may be configured to output visual content (e.g., a graphical user interface) for display at a display device associated with or included within the device.

In some examples, network 12 may be a private network or a public network, such as the Internet. Although illustrated as a single network, network 12 may include a combination of two or more public and/or private networks. Network 12 may be a computer network (e.g., a wide area network (WAN), such as the Internet, a local area network (LAN), or a virtual private network (VPN)), a telephone network (e.g., the PSTN or a wireless network), or another wired or wireless communication network that facilitates communication between customer device 8 and computer information system 14. In some examples, network 12 may be a network (e.g., service provider network) coupled to one or more networks administered by other providers, and thus may form part of a large-scale public network infrastructure, e.g., the Internet.

Computer information system 14, as shown within institution network 20 in the example of FIG. 1, may represent any suitable computing system, such as one or more desktop computers, laptop computers, mainframes, servers, cloud computing systems, etc. capable of sending and receiving information both to and from a network, such as institution network 20 or network 12. In some examples, computer information system 14 may represent or be implemented through one or more virtualized compute instances (e.g., virtual machines, containers) of a data center, cloud computing system, server farm, and/or server cluster. In these or examples, computer information system 14 may be accessible over a network as a web service, website, or other service platform.

Institution network 20 may be a private network associated with a business or financial institution. The business or financial institution affiliated with institution network 20 may be any business, traditional bank, or credit union with the capability to maintain user (e.g., customer) accounts, or may be a third-party for storing information for one or more businesses, traditional banks, or credit unions but might not necessarily maintain any user accounts. Institution network 20 may comprise a centralized or distributed system of computing devices, such as desktop computers, laptops, workstations, wireless devices, cloud-based compute nodes, network-ready appliances, file servers, print servers, or other devices, configured to execute and/or support all or a portion of computer information system 14. For example, institution network 20 may include or have access to a plurality of databases (such as data sources 6), data centers, public or private cloud systems, and other storage facilities in which customer data may be stored.

In addition, institution network 20 may include a plurality of computing devices configured to manage customer accounts and/or communicate with customer devices, such as customer service representative device 10. In some examples, institution network 20 may include one or more access servers configured to receive data from computer information system 14 regarding communications between customer service representative device 10 and customer device 8. Institution network 20 may include both "front-end systems" with which the customers or non-customers of the business or financial institution directly interact to resolve service queries, and "back-end systems" in which information about computer information system 14, the business or financial institution, or existing customers of the business or financial institution is maintained. As an example, customer service representative device 10 may be included in a "front-end system."

As described herein, computer information system 14 may represent a system implemented by a business or financial institution associated with institution network 20, in which computer information system 14 may be used to support customer support operations for users or customers of that business or financial institution.

As shown in FIG. 1, computer information system 14 includes exploration module 15, recommendation module 16, and prediction module 18. Exploration module 15 may analyze historical communications between customers and agents. Recommendation module 16 may generate one or more topic predictions 161 and one or more do/not do recommendations 171 associated with a customer message. As described herein, prediction module 18 may apply a deep learning model to communications to determine a likelihood that a desired outcome will be achieved.

For example, exploration module 15 of computer information system 14 may access historical data 106 from data source 6, where historical data 106 includes information about prior interactions between customers and agents. In some examples, historical data 106 includes instances of bank customer messages and bank agent responses (e.g., a pair of communications). For each message and response pair, historical data 106 also includes information about whether that message and response pair led to either a desired outcome (e.g., the bank customer remaining a banking customer) or an undesirable outcome (e.g., the bank customer no longer being a customer of the bank). Exploration module 15 applies a machine learning model to the collection of historical data 106, where the machine learning model has been trained to predict which of the words or phrases in the message and response tend to affect whether the bank customer remains a customer of the bank (i.e., the desired outcome).

Based on the analysis, exploration module 15 may generate general recommendations 151. For example, as a result of applying a machine learning model to historical data 106, exploration module 15 may identify, based on customer messages, various words, phrases, or expressions that tend to lead to the desired outcome (e.g., customer retention) or tend to lead to the undesirable outcome (e.g., customer departure). Exploration module 15 generates general recommendations 151, which may include information about the topic associated with a given customer message and agent response, along with one or more expressions that might be categorized as "do" or "not do" expressions. Expressions in the "do" category may be expressions that, based on applying a machine learning model trained on historical data 106, exploration module 15 has determined are productive expressions that tend to encourage or otherwise motivate the customer to perform the desired action (i.e., remain a bank customer). Expressions in the "not do" category may be expressions that, again, based on applying the machine learning model trained on historical data 106, exploration module 15 has determined are unproductive expressions that tend to lead the customer to an undesirable outcome (i.e., the customer leaves the bank).

In some cases, exploration module 15 may apply a relatively simple machine learning model that operates using relatively transparent principles, meaning that the decisions made by exploration module 15, based on training data stored in data source 6, can be understood and explained by human analysts. In some examples, exploration module 15 may use a natural language processing model trained as a Support Vector Classifier or similar model. Often, model transparency is a benefit that comes at the cost of prediction accuracy, so the model applied by exploration module 15 might not, in some cases, be as accurate as other models, such as a neural network or other deep learning model. However, the transparency provided by the model used by exploration module 15 may be helpful to enable human analysts to obtain a global understanding about the types of responses to customer messages that tend to be helpful or not helpful, and to gain insights, at least at a high level, about the types of responses that a bank agent should provide in response to various customer inquiries, communications, or messages.

Exploration module 15 may work on an offline basis, meaning that it applies the machine learning model to historical data to gain insights from that historical data, and need not necessarily operate on live or current customer messages in order to provide a prediction for a new message. Accordingly, exploration module 15 may execute occasionally or periodically as data source 6 is updated with additional information, but exploration module 15 generally does not, in at least some examples, operate on live customer interactions.

In FIG. 1, recommendation module 16 may include one or more models that, in at least some examples, are similar to those in exploration module 15. Recommendation module 16 may thus operate in a manner similar to exploration module 15, and may generate one or more topic predictions 161 and one or more do/not do recommendations 171 associated with a customer message. Unlike exploration module 15, however, recommendation module 16 may operate on an online basis, meaning that it may be capable of generating topic predictions 161 and "do"/"not do" recommendations 171 for a contemporaneous customer message, enabling an agent to use such topic predictions 161 and/or do/not do recommendations 171 during live communications with the customer.

Prediction module 18 may include one or more deep learning models or models that may be more accurate (but less transparent) than those used by exploration module 15 or recommendation module 16. In some examples, prediction module 18 may include a Transformers neural network that learns context and understanding through sequential data analysis. In some examples, such a model may use a set of mathematical techniques known as attention or self-attention, which may help identify how distant data influence and depend on one another. Alternatively, or in addition, prediction module 18 may employ models based on other deep learning and/or neural network techniques.

In operation, and in accordance with one or more aspects of the present disclosure, computer information system 14 makes predictions based on a live or active message 76 and communicates the predictions to agent device 10. For instance, in another example that can be described in the context of FIG. 1, computer information system 14 receives message 76 over network 12 and institution network 20. Message 76 may be an email or other text-based communication from a customer, and/or a text, audio, video, or other message received from an application executing on customer device 8 operated by the customer. Message 76 may, in other examples, be an audio message or an audio (or video) signal from a live interaction or conversation between a customer (e.g., operating customer device 8) and an agent (e.g., operating agent device 10). Computer information system 14 processes message 76, as necessary, to convert message 76 into text. For example, where message 76 is not already in text-based form (e.g., message 76 is an audio signal), computer information system 14 processes message 76 to convert the message into text appropriate for use by models included within recommendation module 16 and/or prediction module 18. Computer information system 14 outputs message 76 to recommendation module 16. Recommendation module 16 applies one or more models to generate topic predictions 161 and do/not do recommendations 171. As shown in FIG. 1, computer information system 14 outputs the topic predictions 161 and do/not do recommendations 171 to agent device 10.

Agent device 10 may generate a response to customer message 76, based on the predictions and input from an agent. For instance, continuing with the example being described in the context of FIG. 1, agent device 10 generates a user interface that includes the topic predictions 161 and do/not do recommendations 171. Agent device 10 presents the user interface to an agent operating agent device 10. Agent device 10 detects input that it determines corresponds to response 78 or proposed response 78, which may be a text-based response to message 76 (e.g., an email) or an audio response (e.g., a spoken response by the agent during a live conversation) that the agent generates while or after viewing topic predictions 161 and do/not do recommendations 171. Agent device 10 outputs response 78 to computer information system 14.

Computer information system 14 may provide feedback about proposed response 78. For instance, still referring to FIG. 1, computer information system 14 presents response 78 to prediction module 18. Prediction module 18 applies a deep learning model to both message 76 and response 78 to determine a likelihood that the desired outcome will be achieved (e.g., that the bank will retain the person that is operating device 8 as a customer). Prediction module 18 generates prediction 181, representing the likelihood that the customer will be retained as a customer. In some examples, prediction 181 may take the form of a risk score, representing the risk or likelihood that the customer will no longer be a customer. Prediction module 18 also generates feedback 191, representing additional information about the interaction between the customer and agent that may be useful to the agent. For example, feedback 191 may identify certain words, phrases, or expressions in response 78 that correspond to words that tend to motivate the customer to remain as a customer, or that correspond to words that tend to motivate the customer to leave. Computer information system 14 outputs both prediction 181 and feedback 191 to agent device 10.

Agent device 10 may generate an updated response 80. For instance, again referring to FIG. 1, agent device 10 receives both prediction 181 and feedback 191 from computer information system 14. Agent device 10 generates a user interface that includes information about prediction 181 and feedback 191 that can be used by the agent to modify and possibly improve response 78. Agent device 10 detects input that it determines corresponds to an updated response 80 (e.g., generated by the agent with the benefit of prediction 181 and/or feedback 191). Agent device 10 outputs update response 80 to computer information system 14. Computer information system 14 outputs response 80 over institution network 20 and network 12 to customer device 8. Customer device 8 presents response 80, which could be in text form or even in the form of a live audio or video response, to the customer operating customer device 8. Accordingly, response 80 serves as a response to the original message 76 from the user operating customer device 8.

Computer information system 14 may use information derived from the communication between agents and customers control and/or interact with one or more downstream systems 99. For instance, still referring to FIG. 1, computer information system 14 may evaluate various information about interactions between customer device 8 and agent device 10 to determine whether a policy change or reconfiguration of other computing systems should be made. Information evaluated by computer information system 14 may include the communications in the interaction itself (e.g., messages 76 and/or responses 80), or information generated by computer information system 14 (e.g., general recommendations 151, topic predictions 161, do/not do recommendations 171, and/or feedback 191). Computer information system 14 may also access information in data source 6 to assess trends associated with interactions between customers and bank agents. In some examples, computer information system 14 may identify, based on the evaluated information, a business weakness causing customer attrition. Alternatively, or in addition, computer information system 14 may identify a network inefficiency or malfunction that may cause customer attrition or unhappiness. Alternatively, or in addition, computer information system 14 may identify a software bug or logical error that is leading to inappropriate bank operations or that has or could lead to a security vulnerability.

If computer information system 14 identifies one or more of such issues (or other issues), computer information system 14 may output control signals to modify or control the operation of appropriate downstream systems 99. Such downstream systems 99 may include any system that computer information system 14 might have access to, which may include network devices, business operation computing systems, software development systems, security systems, repositories or other data stores, business partner computing systems, and/or any other appropriate computing device or system. For example, computer information system 14 may modify network operations or how a computing system on the network operates. Alternatively, or in addition, computer information system 14 may modify how security procedures are performed or implemented. Alternatively, or in addition, computer information system 14 may change the operation of systems that control training processes or policy enforcement. Computer information system 14 may also change, modify, control, or otherwise affect the operation of any other system or device within network system 4 or otherwise.

Techniques described herein may therefore provide certain technical advantages. For instance, by providing effective guidance to an agent, not only are more desirable outcomes likely to be achieved, but also, the more effective communication between agent and customer will lead to fewer follow-up communications needed between agent device 11 and customer device 8. Further, by gaining global insights using exploration module 15, and applying those insights to fine tune other models, computer information system 14 will operate more effectively and more accurately. Still further, more effective communications between agent and customer and the devices operated by agent and customer will lead to better control of downstream systems 99. Accordingly, network devices, business operation computing systems or information systems, software development systems, security systems, repositories or other data stores, business partner computing systems, and other computing devices, information systems, and other systems will operate more effectively and/or more security. Moreover, the described systems provide an improved customer experience in which customer concerns and dissatisfaction may be more efficiently and immediately addressed and resolved to provide a more satisfactory banking experience that meets and exceeds the expectations of the customer.

Figure 2A:
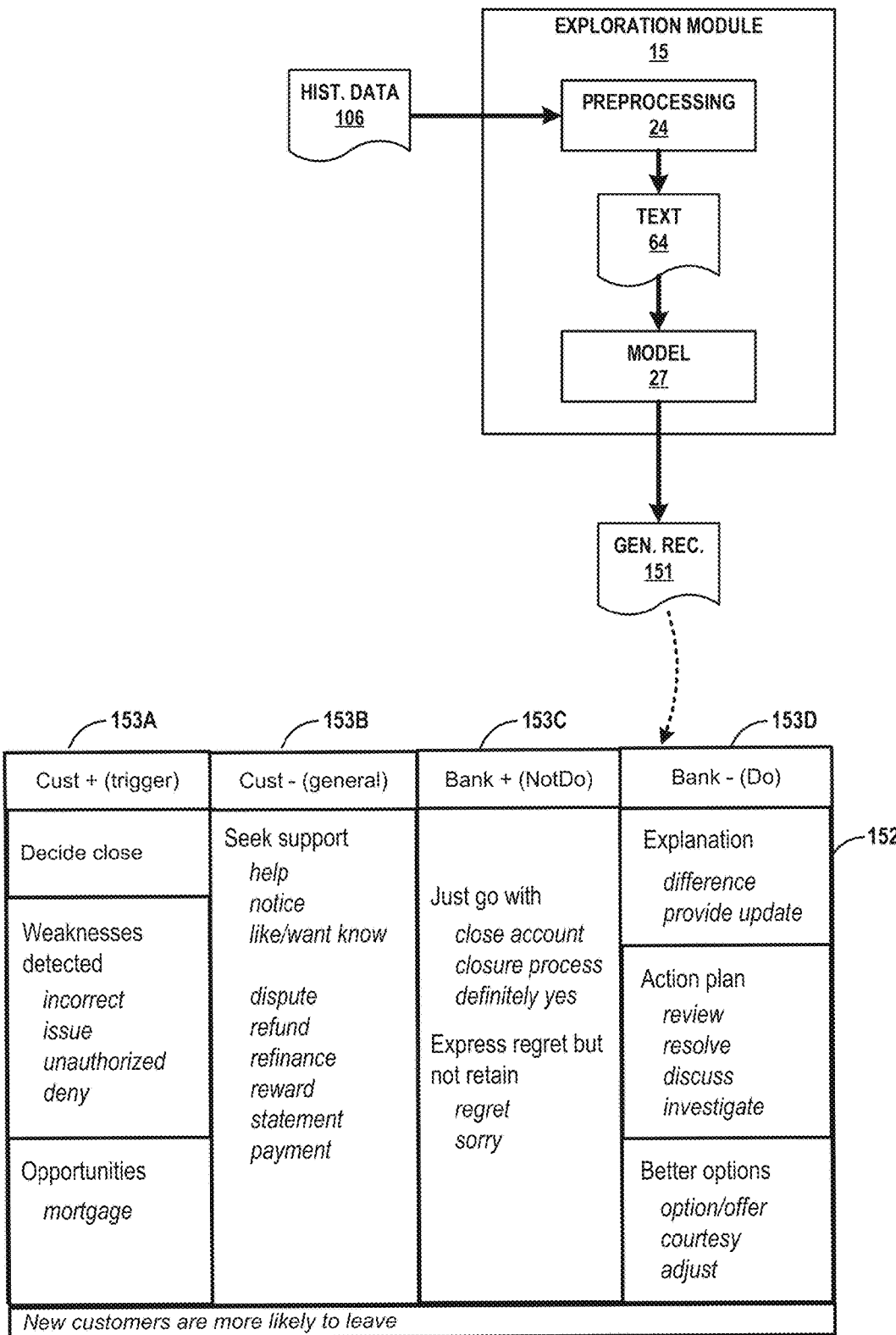
FIG. 2A is a conceptual diagram illustrating the operation of an example exploration module, in accordance with one or more aspects of the present disclosure.

FIG. 2A is a conceptual diagram illustrating the operation of an example exploration module 15, in accordance with one or more aspects of the present disclosure. As illustrated in FIG. 2A, exploration module 15 may include preprocessing module 24, and general recommendation model 27. General recommendation model 27 may be a relatively transparent model trained to identify, from a customer message and based on a desired outcome, potential responsive expressions that are relevant to the desired outcome. In at least some examples, general recommendation model 27 may be chosen more for transparency and/or explainability than accuracy, since the topics and responsive expressions may be used by human analysts to gain insights about the types of communications and/or responses that are helpful (or not helpful) in promoting the desired outcome. Given that purpose for general recommendation model 27, it may be important for a human analyst to understand how the model is operating (or why it is making certain recommendations). In some examples, the responsive expressions generated by general recommendation model 27 include one or more "productive" expressions that, if communicated to the customer, will tend to encourage a desired outcome (e.g., a satisfactory customer experience). In some examples, the responsive expressions may also include "unproductive" or counterproductive expressions that, if communicated to the customer, will tend to discourage the desired outcome. As described in FIG. 1, such expressions may be categorized or characterized, for each topic, as "do" or "not do" recommendations 171, as described in connection with FIG. 1 (see FIG. 2D).

In operation, preprocessing module 24 of exploration module 15 receives historical data 106, which, as described in connection with FIG. 1, may include historical instances of customer messages and agent responses. In some cases, historical data 106 is text or other data derived from text or email communications or from audio recordings of interactions between banking customers and bank agents. In other examples, historical data 106 may text data derived from other types of communications between customers and bank agents. Preprocessing module 24 may process historical data 106 in one or more ways, such as by cleaning, validating, tokenizing, or normalizing historical data 106 to generate processed text 64. In general, preprocessing module 24 transforms historical data 106 into processed text 64, which has a form suitable for input to general recommendation model 27. Preprocessing module 24 outputs processed text 64 to general recommendation model 27. Exploration module 15 applies general recommendation model 27 to processed text 64. Applying general recommendation model 27 to processed text 64 results in one or more general recommendations 151. Exploration module 15 outputs general recommendation 151 for analysis.

General recommendations 151 may correspond to data such as that illustrated in the example chart 152 of FIG. 2A. Chart 152 illustrates various example expressions associated with communications between a customer and a bank agent, where the desired outcome is the bank retaining the customer (and where the undesirable outcome is the customer leaving the bank). In various examples, this may include providing a satisfactory customer experience for the customer. Columns 153A and 153B of chart 152 list examples of expressions made by or otherwise expressed by the customer. Column 153A lists examples of expressions that tend to be correlated with the customer leaving the bank (the "undesirable" outcome), and column 153B lists expressions that tend to be correlated with the customer staying with the bank (the "desirable" outcome) as a customer. Columns 153C and 153D list examples of expressions stated or otherwise expressed by the agent. Column 153C lists examples of expressions that tend to be correlated with the customer leaving the bank, and column 153D lists examples of expressions that tend to be correlated with the customer staying at the bank. Expressions in column 153C may be characterized as "not do" expressions, or expressions that the agent should avoid communicating to the customer. Expressions in column 153D may be characterized as "do" expressions, or expressions that the agent should seek to communicate to the customer, since they promote the desired outcome. A human analyst might study data having the form illustrated in chart 152 and gain insights into how to best communicate with banking customers to achieve a desired outcome, such as retaining someone as a customer of the bank. Such insights may be used to adjust or refine other models in operation within network system 4 of FIG. 1, such as those employed by recommendation module 16 and/or prediction module 18.

Figure 2B:
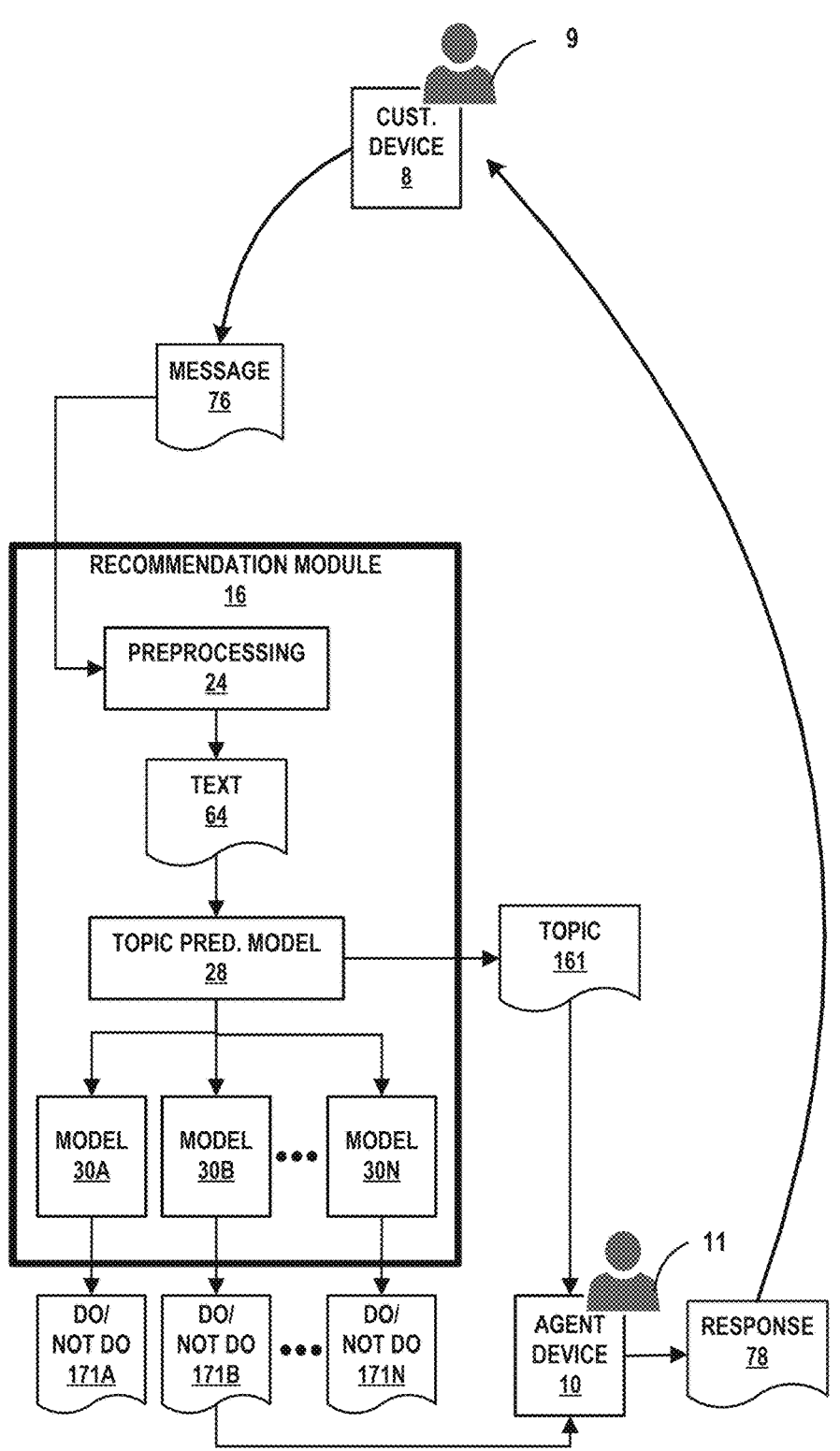
FIG. 2B is a conceptual diagram illustrating the operation of an example recommendation module, in accordance with one or more aspects of the present disclosure.

FIG. 2B is a conceptual diagram illustrating the operation of an example recommendation module 16, in accordance with one or more aspects of the present disclosure. As illustrated in FIG. 2B, recommendation module 16 may include preprocessing module 24, topic prediction model 28, and a plurality of do/not do recommendation models 30A through 30N ("do/not do recommendation models 30"). As described herein, recommendation module 16 generates data that may be used by an operator of agent device 10 (e.g., agent 11) when communicating with a customer, and in particular, when responding to customer message 76. In some examples, data generated by recommendation module 16 may be used in a live, ongoing communication between customer 9 (operating customer device 8) and agent 11 (operating agent device 10).

To generate data for use by agent 11, recommendation module 16 employs topic prediction model 28 and a number of do/not do recommendation models 30. Topic prediction model 28 may be any appropriate model for predicting a topic based on a customer message 76. In some examples, topic prediction model 28 may be a latent Dirichlet allocation model that seeks to group customer messages into a finite number of clusters or topics. Do/not do recommendation models 30 may be any appropriate model for generating a list of "do/not do" expressions associated with a topic and customer message 76. As illustrated in FIG. 2B, each of do/not do recommendation model 30 may be dedicated to a particular topic (or set of topics) predicted by topic prediction model 28, and each of do/not do recommendation models 30 may be trained to predict various "do/not do" expressions based on a specific topic. In some examples, one or more of recommendation models 30 may be implemented as models based on Support Vector Classifier (SVC) techniques.

In some examples, a human analyst may adjust or tune any of topic prediction models 28 and/or do/not do recommendation models 30 based on insights gained from general recommendations 151. For example, a human analyst may help to select the topics predicted by topic prediction model 28, or may determine that combining or consolidating one or more of such topics is appropriate.

In operation, recommendation module 16 receives customer message 76 from customer device 8 (e.g., through a network). Preprocessing module 24 of recommendation module 16 performs operations similar to preprocessing module 24 of FIG. 2A to prepare message 76 for processing by topic prediction model 28 and/or recommendation models 30. In some examples, preprocessing module 24 may be the same module employed by exploration module 15 of FIG. 2A. Preprocessing module 24 processes message 76 to produce processed text 64, suitable for use as input to topic prediction model 28 (and recommendation models 30). Recommendation module 16 applies topic prediction model 28 to processed text 64 to generate topic prediction 161. Recommendation module 16 outputs topic prediction 161 to agent device 10. Once topic prediction 161 is determined, recommendation module 16 identifies the appropriate do/not do recommendation model 30 (i.e., recommendation module 16 identifies the model 30 specific to the topic predicted by model 28).

For the sake of illustration, in one example, recommendation module 16 identifies recommendation model 30B as the appropriate recommendation model 30. In such an example, recommendation module 16 applies model 30B to processed text 64. In response, model 30B generates or predicts do/not do recommendations 171B. Recommendation model 30B outputs do/not do recommendation 171B to agent device 10.

Agent device 10 may generate a response based on input from an agent. For instance, agent device 10 generates a user interface that includes topic prediction 161 and do/not do recommendations 171B. Agent device 10 presents the user interface to agent 11 at agent device 10 (e.g., at a display associated with agent device 10). Thereafter, agent device 10 detects input that it determines corresponds to response 78, which may represent a response generated by agent 11 based on the information included in the presented user interface (i.e., topic prediction 161 and/or do/not do recommendations 171B). Agent device 10 outputs the response to customer device 8, thereby continuing the communication between customer 9 and agent 11. As previously discussed, in various examples, this may facilitate a communication with the customer (e.g., via customer device 8) that is more attuned to the customer's needs and expectations that are associated with a satisfactory customer experience.

Figure 2C:
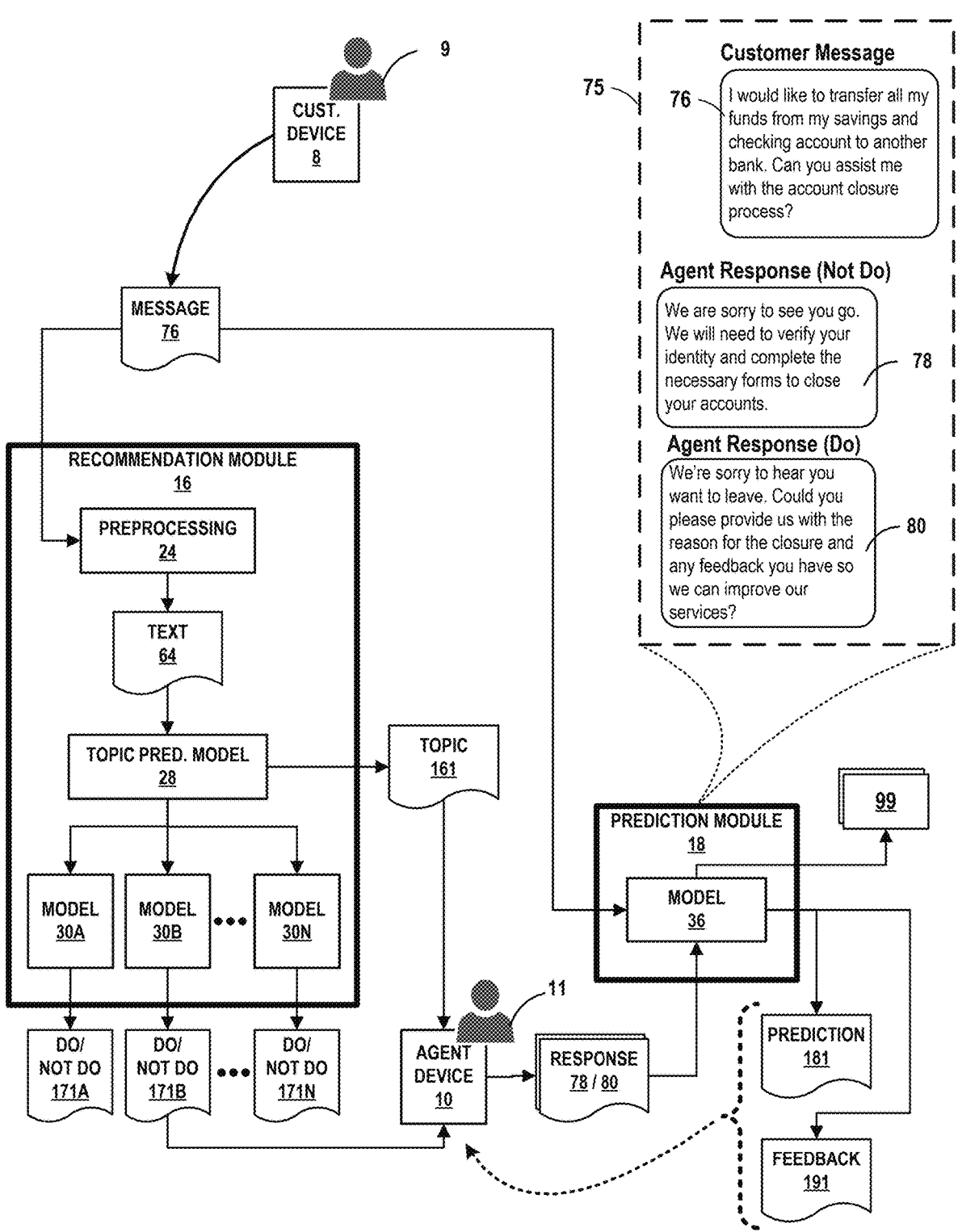
FIG. 2C is a conceptual diagram illustrating the operation of both an example recommendation module and an example prediction module, in accordance with one or more aspects of the present disclosure.

FIG. 2C is a conceptual diagram illustrating the operation of both an example recommendation module 16 and an example prediction module 18, in accordance with one or more aspects of the present disclosure. FIG. 2C is similar to FIG. 2B, but additionally illustrates prediction module 18. Prediction module 18 includes one or more deep learning models 36. Such models may be based on algorithms that are more accurate (but possibly less transparent) than other models described herein (e.g., topic prediction model 28, do/not do recommendation models 30). In one example, deep learning model 36 may be implemented as a Transformer neural network.

FIG. 2C illustrates how recommendation module 16 and prediction module 18 may work together to provide further communication support for agent 11 operating agent device 10. Recommendation module 16 and prediction module 18 may also work together for other purposes. Such other purposes may include improving the operation and/or accuracy and/or performance of recommendation module 16, verifying effectiveness of training, identifying weaknesses in business operations, providing data for case-wide studies, and/or additionally affecting and/or controlling downstream systems 99.

In operation, and as previously described in connection with FIG. 1 and FIG. 2B, recommendation module 16 of computer information system 14 processes message 76, outputs both topic prediction 161 and do/not do recommendations 171 to agent device 10, and then receives response 78 from agent device 10 for communication to customer device 8. In the example of FIG. 2C, however, recommendation module 16 may apply deep learning model 36 to both response 78 and message 76 in order to generate additional information. As illustrated in FIG. 2C, deep learning model 36 produces prediction 181 and feedback 191 based on at least message 76 and response 78.

Prediction 181 may be a prediction or risk score representing the likelihood, based on both the customer message 76 and the agent's initial response 78, that a specific desired outcome will occur (e.g., that response 78 will be successful in retaining customer 9 as a bank customer). In some examples, prediction 181 may be expressed as a percentage, indicating the predicted odds that response 78, if used as a response to message 76, will result in retention of customer 9 by the bank. However, in other examples, prediction 181 may be expressed in other ways.

Feedback 191 may represent additional information about response 78 and/or prediction 181 and may provide guidance as to how response 78 may be improved. For example, feedback 191 may identify which words, phrases, or other expressions in response 78 tend to encourage the desired outcome (e.g., provide a satisfactory customer experience). Correspondingly, feedback 191 may also identify words, phrases, or other expressions included in response 78 that tend to discourage the desired outcome.

Agent device 10 may generate an updated response 80 based on prediction 181 and/or feedback 191. For instance, recommendation module 16 outputs both prediction 181 and feedback 191 to agent device 10. Agent device 10 generates a user interface, based on prediction 181 and feedback 191, that agent 11 may use when preparing a response to message 76. For example, agent device 10 may present a user interface that includes a likelihood that response 78 will result in the desired outcome (where such likelihood is based on prediction 181). Alternatively, or in addition, agent device 10 may present a user interface in which words or expressions included in response 78 (or message 76) are highlighted or otherwise noted, based on feedback 191, to indicate which words or expressions tend to encourage or discourage achieving the desired outcome (see, for example, FIG. 4A and FIG. 4B). By presenting such information in a user interface, agent device 10 may enable agent 11 to modify response 78 and generate a new (or updated) and improved response 80 (e.g., see box 75, illustrating information that may be included in a user interface presented by agent device 10). In some examples, this process may continue, with agent device 10 outputting the improved response 80 back to prediction module 18, and deep learning model 36 within prediction module 18 generating new prediction 181 and feedback 191, which agent device 10 then uses to present a new user interface providing further guidance about the agent's response. Agent device 10 may receive further input representing modifications to response 80, and agent 11 may repeatedly edit response 80. Once response 80 is finalized, agent device 10 outputs response 80 to customer device 8, thereby continuing the communication between customer 9 and agent 11.

In some examples, prediction module 18 may enable message 76, response 80, predictions 181, and/or feedback 191 to be used for other purposes. For example, as described in connection with FIG. 1, message 76, response 80, predictions 181, and/or feedback 191 may be used to affect or control one or more downstream systems 99. Alternatively, or in addition, prediction module 18 may use such information to further refine and/or retrain or verify training effectiveness of other models, including topic prediction model 28 and one or more of do/not do recommendation models 30. Alternatively, or in addition, prediction module 18 may use such information to identify weaknesses in business operations, such as aspects of the bank's business that are not competitive with rival banking businesses. Alternatively, or in addition, prediction module 18 may use such information to perform case-wide studies, further providing general insights and global understanding of how to make interactions between customers and agents more productive.

In the example described above, deep learning model 36 is described as generating both prediction 181 and feedback 191. In some examples, however, a separate model may be used to generate feedback 191. In such an implementation, feedback 191 may be generated by a more transparent model that iteratively modifies a given response (or message 76) to determine which of the words tend to affect the prediction 181 generated by deep learning model 36. In some examples, feedback 191 may be generated by a model capable of local interpretable model-agnostic explanations ("LIME"); such a model may approximate deep learning model 36 (i.e., "black box" model) with a local, interpretable model to explain each individual prediction.

FIG. 2D illustrates an example do/not do recommendation chart illustrating possible example "do/not do" expressions or recommendations associated with various topics, in accordance with one or more aspects of the present disclosure. The leftmost column of recommendation chart 172 lists various topics that may be identified by topic prediction model 28 based on a given customer message. These topics may correspond to potential topic prediction categories, or example topic predictions 161. The rightmost column of do/not do recommendation chart 172 lists various words and/or word stems that represent expressions that, if used in a response by the agent to the customer message, will tend to achieve a desired outcome (e.g., retaining the bank customer). These expressions may correspond to "do" recommendations 171. The middle column in recommendation chart 172 lists various words and/or word stems that represent expressions that, if used in a response by the agent to the customer message, will tend to not achieve the desired outcome. Accordingly, these expressions may correspond to "not do" recommendations 171.

The information presented in do/not do recommendation chart 172 may be used by recommendation module 16 when generating do/not do recommendations 171, and may be incorporated into a user interface by agent device 10. Agent 11 may reference or otherwise use the information in such a user interface when formulating a response to customer message 76. Specifically, agent 11 may avoid certain expressions (e.g., "not do" expressions in the middle column) and seek to use other listed expressions (e.g., "do" expressions in the rightmost column). If these expressions are used appropriately by agent 11, the desired outcome would be expected to be more likely to occur.

Figure 3:
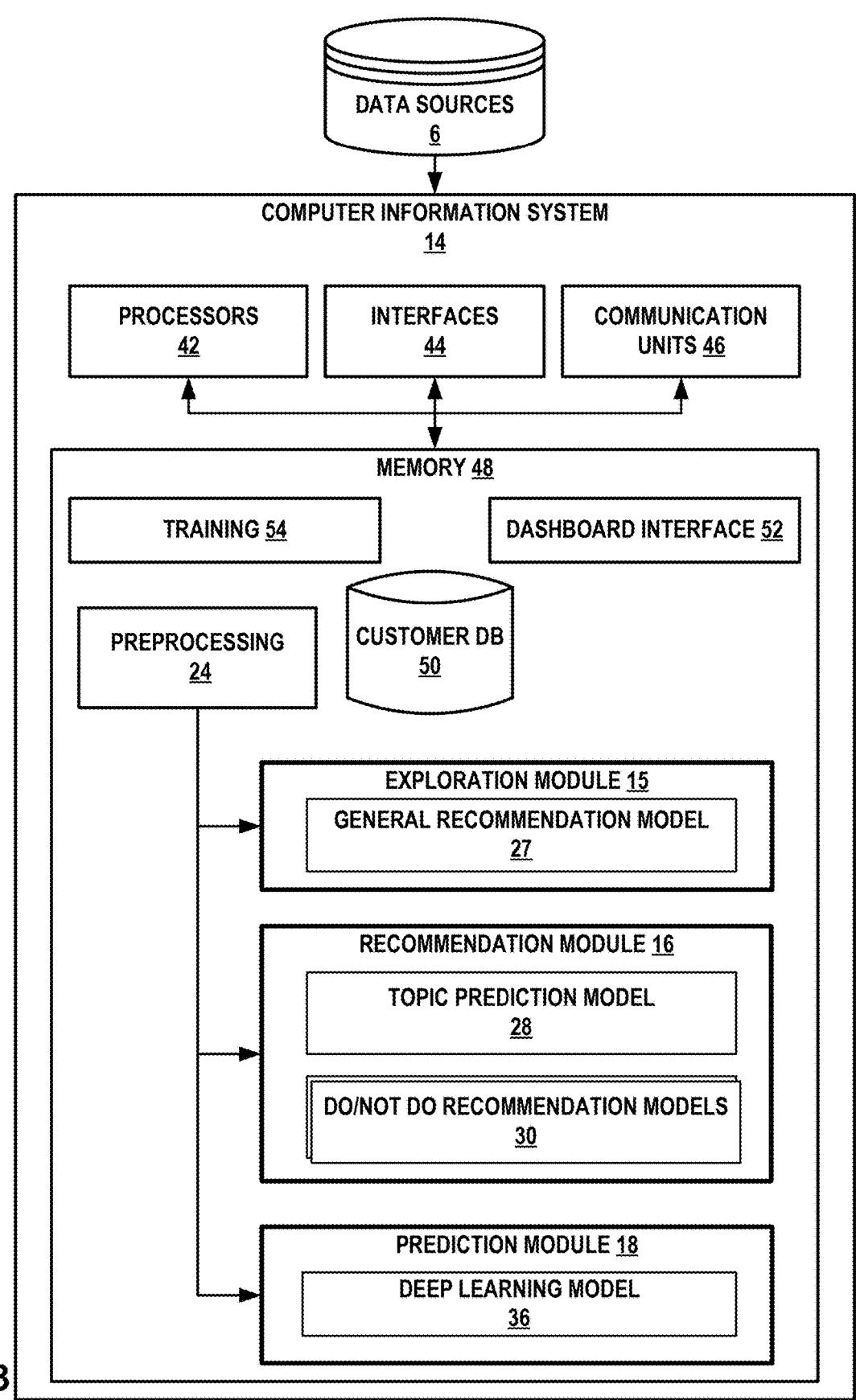
FIG. 3 is a block diagram illustrating an example system that analyzes communications and outputs response guidance at an agent device, in accordance with one or more aspects of the present disclosure.

FIG. 3 is a block diagram illustrating an example system that analyzes communications and outputs response guidance at an agent device, in accordance with one or more aspects of the present disclosure. In the example of FIG. 3, computer information system 14 includes one or more processors 42, one or more interfaces 44, one or more communication units 46, and one or more memory units 48. Computer information system 14 further includes exploration module 15, recommendation module 16, prediction module 18, processing module 24, dashboard interface module 52, customer database 50, and training module 54, each of which may be implemented as program instructions and/or data stored in memory 48 and executable by processors 42 or implemented as one or more hardware units or devices of computer information system 14. Recommendation module 16 may include topic prediction model 28 and recommendation model 30. Prediction module 18 may include deep learning model 36. In some examples, deep learning model 36 may be implemented through a version of BERT (Bidirectional Encoder Representations from Transformers), a pre-trained transformer model known for its efficacy in natural language processing (NLP) tasks. BERT may process data and identify linguistic patterns, tone, and context within customer communications, and as such, may identify subtle shifts in customer sentiment that may precede attrition.

Memory 48 of computer information system 14 may also store an operating system (not shown) executable by processors 42 to control the operation of components of computer information system 14. Although not shown in FIG. 3, the components, units, or modules of computer information system 14 are coupled (physically, communicatively, and/or operatively) using communication channels for inter-component or inter-module communications. In some examples, the communication channels may include a system bus, a network connection, an inter-process communication data structure, or any other method for communicating data.

Processors 42, in one example, may comprise one or more processors that are configured to implement functionality and/or process instructions for execution within computer information system 14. For example, processors 42 may be capable of processing instructions stored by memory 48. Processors 42 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 48 may be configured to store information within computer information system 14 during operation. Memory 48 may include a computer-readable storage medium or computer-readable storage device. In some examples, memory 48 includes one or more of a short-term memory or a long-term memory. Memory 48 may include, for example, random access memories (RAM), dynamic random-access memories (DRAM), static random access memories (SRAM), magnetic discs, optical discs, flash memories, or forms of electrically programmable memories (EPROM) or electrically erasable and programmable memories (EE-PROM). In some examples, memory 48 is used to store program instructions for execution by processors 42. Memory 48 may be used by software or applications running on computer information system 14 to temporarily store information during program execution.

Computer information system 14 may utilize communication units 46 to communicate with external devices via one or more networks, such as one or more customer devices and one or more customer service representative devices. Communication units 46 may be network interfaces, such as Ethernet interfaces, optical transceivers, radio frequency (RF) transceivers, or any other type of devices that can send and receive information. Other examples of such network interfaces may include Wi-Fi, NFC, or Bluetooth® radios. In some examples, computer information system 14 utilizes communication unit 46 to communicate with external data stores via one or more networks.

Computer information system 14 may utilize interfaces 44 to communicate with external systems or user computing devices via one or more networks. The communication may be wired, wireless, or any combination thereof. Interfaces 44 may be network interfaces (such as Ethernet interfaces, optical transceivers, radio frequency (RF) transceivers, Wi-Fi or Bluetooth radios, or the like), telephony interfaces, or any other type of devices that can send and receive information. Interfaces 44 may also be output by computer information system 14 and displayed on user computing devices.

As shown in the example of FIG. 3, computer information system 14 may receive data from data sources 6, which may include customer data stored by other systems of institution network 20 of FIG. 1. As described above, in some examples, data sources 6 may also store internal data for the business or financial institution associated with institution network 20. For example, data sources 6 may store data pertaining to products, deals, promotions, etc. offered by the business or financial institution, such as credit card offers, rewards programs, etc. that may be incorporated into the one or more topic-based response recommendations generated by recommendation module 16. In some examples, computer information system 14 may also store customer data in customer database 50. Customer database 50 may store data received from data sources 6, data received from a customer (e.g., data pertaining to natural language audio input received from a customer), and/or historical customer data. For example, in some examples, customer database 50 may store a general training dictionary and/or a customer topic library that includes common keywords and/or topics with which customer queries have historically been associated. As described herein with respect to training module 54, the historical customer data stored in customer database 50 may be used to train the models described herein, such as topic prediction model 28, which may be trained on the general training dictionary and/or customer topic library to better predict topics associated with customer queries.

In some examples, customer database 50 may serve as a central repository for data pertaining to customers of institution network 20. Customer database 50 may be configured to store data sources in a variety of formats, such as structured, semi-structured, and unstructured data. Customer database 50 may also store data sources in different storage systems, such as relational databases, data lakes, or cloud storage. Customer database 50 may be configured to handle large amounts of data while meeting scalability and performance requirements. Customer database 50 may also provide a secure and controlled access to customer data by implementing access control mechanisms such as role-based access control, data masking, and encryption to protect the data from unauthorized access, disclosure, alteration, or destruction. Additionally, customer database 50 may provide a way to version the data sources, and track changes to the data over time. Customer database 50 may also support data lineage, or provide information about where the data came from, how it was processed, and how it was used.

In some examples, customer database 50 may be configured as an event log that stores data for each customer query received by computer information system 14. For example, customer database 50 may store customer data associated with actions performed during the communication between customer device 8 and customer service representative device 10. In some examples, customer database 50 may also store context data associated with, for example, origins of the communication. Customer database 50 may be configured to store both the customer communication data and the context data, and to correlate the customer communication data and context data with previous communications for the same customer to provide historical customer data. In some examples, customer database 50 may gather the customer communication data and the context data by requesting the data via application programming interfaces (APIs) for the disparate systems and/or by receiving the data via event log software plugins installed in the disparate systems. In some examples, customer database 50 may be configured as a data cache.

In some examples, computer information system 14 may implement preprocessing module 24 to perform data processing, or filter and sort customer data received from data sources 6 or any other device or systems in communication with computer information system 14 prior to computer information system 14 storing the data in customer database 50. Preprocessing module 24 may also clean, validate, normalize, and/or transform customer data such that it is consistent, accurate, and understandable. For example, preprocessing module 24 may perform a quality check on customer data by applying validation rules and data quality metrics to ensure that customer data is accurate and complete. In some examples, preprocessing module 24 may output customer data in a format that can be easily consumed by other downstream systems, such as a data warehouse, a business intelligence tool, or a machine learning model, such as topic prediction model 28 of recommendation module 16. Preprocessing module 24 may also be configured to maintain data governance policies and procedures set forth by a business or financial institution for data lineage, data security, data privacy, and data audit trails. In some examples, preprocessing module 24 is responsible for identifying and handling any errors that occur during the data collection, integration, and consolidation process. For example, preprocessing module 24 may log errors, alert administrators, and/or implement error recovery procedures. Preprocessing module 24 may also ensure optimal performance of the system by monitoring system resource usage and implementing performance optimization techniques such as data caching, indexing, and/or partitioning.

As described herein, preprocessing module 24 may include one or more speech-to-text (STT) algorithms configured to convert the natural language audio input to text data, or a text representation of spoken words from the audio input. The text data may be unstructured text data or structured text data. In some examples, the one or more speech-to-text algorithms may implement machine learning techniques to generate text data, including deep neural networks, Transformer models, or any other appropriate model.

As such, the output of the STT algorithms may be a detailed and accurate text representation of the customer's spoken words. This text data, which can be either unstructured or structured, may then be fed into other components of computer information system 14 for further analysis and processing. For instance, the text data may be analyzed by topic prediction model 28 to extract relevant information, identify customer queries or concerns, and facilitate effective response generation. By employing a combination of statistical models, neural networks, and advanced language processing techniques, computer information system 14 may effectively capture and interpret a wide range of customer speech patterns and dialects.

In some examples, preprocessing module 24 may convert unstructured text data received by computer information system 14 to structured text. For example, computer information system 14 may receive or generate data in the form of any structure or programming language. Preprocessing module 24 may then convert the data to a particular structured format, such as an extensible Markup Language (XML). In some examples, preprocessing module 24 may determine the types of data to include in the XML representation. In some examples, computer information system 14 may also generate or otherwise retrieve contextual information that helps interpret the data. Preprocessing module 24 may receive this information and generate a more accurate and effective XML (or other structured text) representation. In some examples, preprocessing module 24 may alternatively convert the data into other structured text types, such as, but not limited to, HTML, JSON, CSV, INI Files, etc. In this way, the data received by computer information system 14 can be provided to machine learning models implemented by computer information system 14 in a standardized format. In some examples, the structured text data generated by preprocessing module 24 may be stored in customer database 50.

In some examples, existing data management sources and controls may be integrated into computer information system 14 to prevent disruption of any existing processes. In some examples, ongoing maintenance for data management sources and controls may be provided for computer information system 14. In some examples, data quality checks and approval mechanisms may be provided for ensuring that data loaded into computer information system 14 is accurate. In some examples, computer information system 14 may utilize machine learning capabilities to rationalize data. In some examples, computer information system 14 may use a manual process to rationalize data. In some examples, computer information system 14 may implement a server-based portal for confirmation/approval workflows to confirm data.

As described herein, recommendation module 16 may apply topic prediction model 28 to the structured text data and/or unstructured text data stored in customer database 50 to determine one or more topics. In some examples, topic prediction model 28 may be or otherwise include Latent Dirichlet Allocation (LDA) to identify topics in the text data. As an example, topic prediction model 28 may receive unstructured data or structured data from customer database 50 and/or preprocessing module 24, in which the data which may comprise text data or collections of documents in which each document is represented as a bag-of-words (e.g., each document may be represented as a vector of word frequencies or term frequencies present in customer queries). In these examples, topic prediction model 28 may assume that the documents include mixtures of topics, and that each topic includes a mixture of words. Topic prediction model 28 may be configured to predict the underlying topics and their distributions in each document, as well as the distribution of words for each topic. Topic prediction model 28 may output the predicted distributions of topics in each document and the predicted distributions of words in each topic. Specifically, for each predicted topic, topic prediction model 28 may generate a probability distribution over all the words, in which the distributions may indicate the likelihood of each word belonging to the respective topic. In some examples, the output of topic prediction model 28 may include a matrix including rows that represent topics, columns that represent words, and values that represent probabilities. For example, topic prediction model 28 may determine the example query such as, "I would like to transfer all my funds from my savings and checking account to another bank. Can you assist me with the account closure process?" to include a topic including words such as "transfer", "account", and "close", in which each word may be associated with a probability that indicates the likelihood of the word belonging to the topic.

In some examples, topic prediction model 28 may be or otherwise include a large language model that takes structured text data as input. In some examples, topic prediction model 28 may be a transformer-based neural network or another type of neural network. In some examples, topic prediction model 28 may include an autoencoder, which may be configured to learn a representation (e.g., a lower-dimensional encoding) for a set of data, and perform dimensionality reduction. In some examples, the autoencoder may encode the input data and provide output data configured to reconstruct the input data. Topic prediction model 28 may be or otherwise include one or more other forms of artificial neural networks, which in some examples may be combined (e.g., stacked) to form more complex networks. In some examples, topic prediction model 28 may include one or more feed forward networks or one or more recurrent neural networks.

In some examples, the historical data (e.g., historical data 106, see FIG. 1) associated with one or more customers may include user-item interactions that indicate how customers have historically interacted with items in computer information system 14. As described herein, the plurality of customers may be customers of the financial institution or business associated with institution network 20, and who may or may not be of a similar demographic as the customer operating customer device 8. The interactions between the plurality of customers and computer information system 14 may be tracked and recorded by computer information system 14 to understand the preferences, behavior, and activities of the customers. In some examples, the interactions may include prior communications between computer information system 14 and the plurality of customers. The historical data may indicate prior outcomes from the prior communications, and in some examples, may include data associated with the query or message 76 provided by the customer operating customer device 8. The items in the user-item interactions may refer to various types of actions that customers take with respect to items within institution network 20, such as purchase or transaction history, ratings or reviews, search queries, clicks and views, opening and closing of accounts, etc. In some examples, recommendation models 30 may use the historical data, including the user-item interactions, to predict at least one "do" or "not do" recommendation for each of the one or more topics predicted by topic prediction model 28 (e.g., such a recommendation may include one or more recommended keywords and one or more not recommended keywords). In this way, computer information system 14 may predict customer preferences for responses to various queries and personalize the customer experience based on historical customer behavior. In some examples, recommendation models 30 may retrieve additional features, such as contextual information, social interactions, or explicit customer preferences from customer database 50 to further improve the accuracy of the at least one recommendation.

As described herein, the recommendation(s) may include one or more "do" or recommended keywords, and one or more "not do" or not recommended keywords. For example, for the topic including the word "close", which may be associated with a high likelihood of an undesirable outcome, computer information system 14 may predict a "do" response recommendation (e.g., a positive recommendation or recommendation including the one or more recommended keywords), such as a response including "We're sorry to hear you want to leave," or recommended keywords such as "thank," "transfer," and "option", and a "not do" response recommendation (e.g., a negative recommendation or recommendation including the one or more not recommended keywords), such as "We are sorry to see you go," or not recommended keywords such as "sorry," "close account," and "closure." In other examples, computer information system 14 may predict one or more recommended keywords, such as "issue," "thank," "investigate," "transfer," "option," etc., and one or more not recommended keywords, such as "sorry," "close," "close account," "closure," "reason," etc., in which a customer service representative or agent may formulate their own response that includes the recommended keywords and does not include the not recommended keywords.

Computer information system 14 may provide the response recommendations to the agent device via a generated user interface, such that the agent can respond to the customer, e.g., in near real-time. As described herein, processors 42 may execute one or more components of memory 48, such as customer database 50, recommendation module 16, prediction module 18, and dashboard interface module 52 to provide one or more topic-based response recommendations to an agent in communication with a customer. As described above, recommendation module 16 may be configured to implement a machine learning architecture to generate the one or more topic-based response recommendations, which may be in the form of text data that is in a readable or "user-friendly" format, such that the agent can easily understand and provide one or more responses to the customer. Dashboard interface module 52 may receive, from recommendation module 16, a response recommendation for each of the one or more topics, which may include one or more recommended keywords and one or more not recommended keywords. Dashboard interface module 52 may also retrieve data from customer database 50 that is relevant to the at least one recommendation. Dashboard interface module 52 may be configured to generate a user interface or dashboard configured to display a recommendation for each of the one or more topics. As described herein, such a dashboard interface, generated by dashboard interface module 52, may include a textual representation of a live conversation held between the customer and the agent. Computer information system 14 may send the data representative of the user interface generated by dashboard interface module 52 to agent device 10 of FIG. 1 via interfaces 44. As described above, agent device 10 may include one or more user interface devices (e.g., a display screen) that can then display the dashboard or user interface generated by dashboard interface module 52, thereby presenting to the agent topic-based response recommendations. In some examples, as described above, the recommendations may include one or more full sentences generated by recommendation module 16 or prediction module 18; in other examples, the recommendation may include one or more recommended keywords and/or one or more not recommended keywords.

As shown in the example of FIG. 3, computer information system 14 includes training module 54. Training module 54 may be configured to train (e.g., pre-train, fine-tune, etc.) one or more models included in the machine learning architecture described herein such as to improve the accuracy and effectiveness of the output provided by computer information system 14. In some examples, training module 54 may train topic prediction model 28 and/or recommendation models 30 (or at least verify the training of these models) with the output predicted by prediction module 18. Specifically, in some examples, the predicted satisfaction scores for each response may be provided to topic prediction model 28, such that topic prediction model 28 may more accurately classify topics in customer message 76. Training module 54 may also train topic-based recommendation models 30 with historical data associated with the plurality of users, which may include historical predicted satisfaction scores for historical recommendations provided for similar topic(s). As such, the accuracy of models 28 and 30 may be improved, as the predicted satisfaction scores may indicate whether or not these models are making accurate predictions. For example, if topic prediction model 30 predicted a topic that resulted in a specific recommended response, but prediction module 18 predicted a customer satisfaction score for the provided response that was less than a desired threshold, data indicating the inaccuracy may be provided to training module 54 such that topic prediction model 30 can be retrained to improve accuracy.

In some examples, training module 54 may occasionally, continuously, or periodically train the one or more models described herein. In some examples, training module 54 may fine-tune the one or more models by using feedback in the training process, such as the feedback provided by prediction module 18 described above. As described above, in some examples, computer information system 14 may receive other feedback data from institution network 20 of FIG. 1 that indicates a customer's actions after communication with the customer service representative, e.g., closing or opening of an account, etc. Computer information system 14 may transmit the feedback to training module 54, in which training module 54 uses the feedback for training. For example, training module 54 may convert the feedback into labeled data for supervised training. Additionally, or alternatively, training module 54 may fine-tune the one or more models by monitoring the relationship between the performance of the one or more models and the received feedback, and iterate the fine-tuning process as necessary (e.g., to receive more positive feedback and less negative feedback). In this way, computer information system 14 may continuously train and update the machine learning architecture described herein with ever-changing customer behaviors and preferences, thereby improving the efficacy and accuracy of the response recommendations and the subsequent customer satisfaction.

Modules illustrated in FIG. 3 (e.g., exploration module 15, recommendation module 16, prediction module 18, preprocessing module 24, and training module 54) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4A:
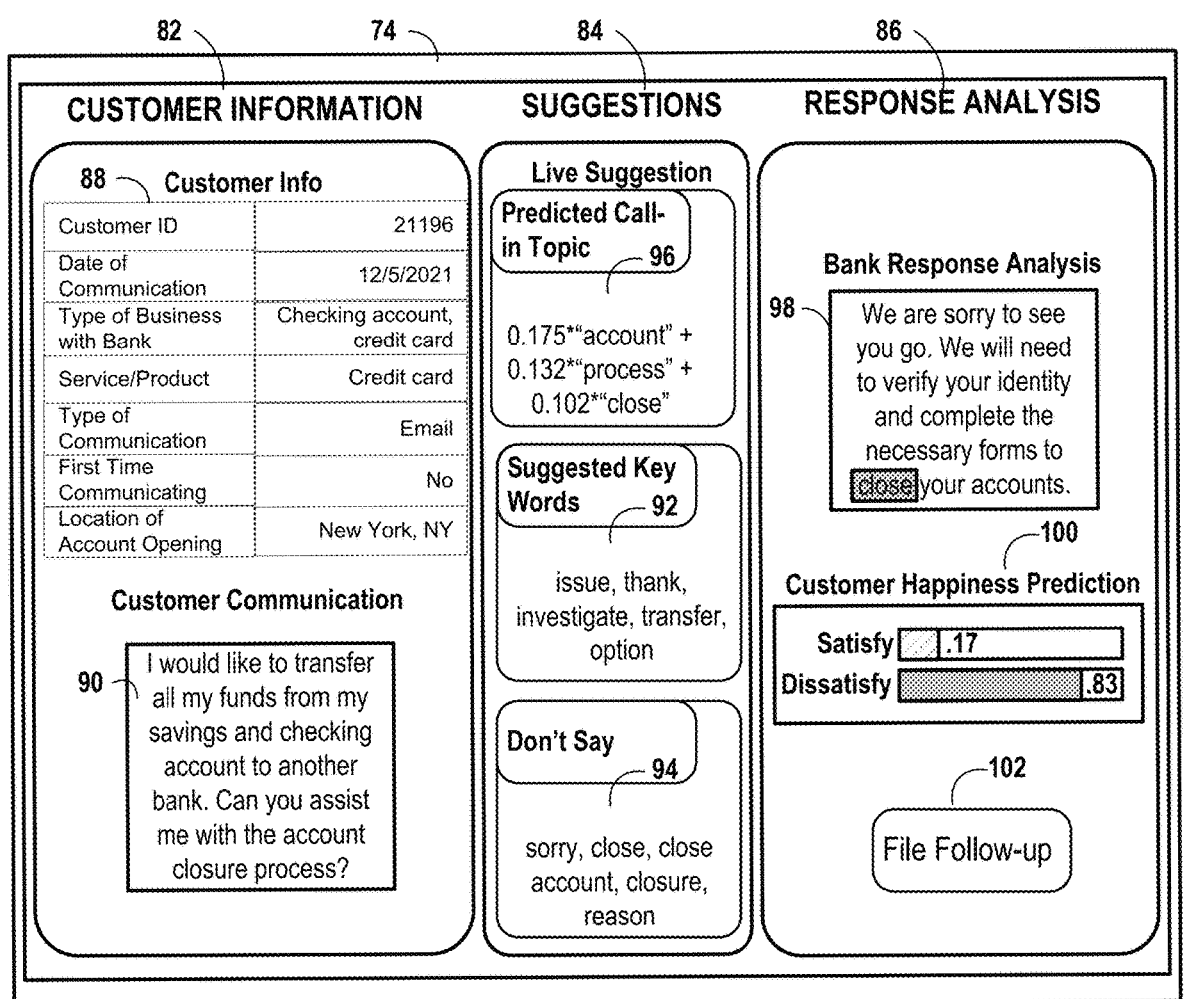
FIG. 4A is a conceptual diagram illustrating an example dashboard interface for displaying topic-based response recommendations, in accordance with one or more techniques of this disclosure.

FIG. 4A is a conceptual diagram illustrating an example dashboard interface for displaying topic-based response recommendations in during a live interaction, in accordance with one or more techniques of this disclosure. The example of FIG. 4A illustrates dashboard interface 74, including user interface (UI) elements such as customer information column 82, suggestions column 84, and response analysis column 86. As illustrated, dashboard interface 74 may include a textual representation of a live conversation being held between a customer and an agent, and may be presented by, for example, via a user interface device associated with agent device 10 of FIG. 1.

As shown in the example of FIG. 4A, customer information column 82 may further display UI elements such as customer information table 88 and customer communication textbox 90. As described herein, customer information table 88 may display information associated with the customer in communication with agent. For example, customer information table 88 may display customer ID, date of communication, type of business that the customer has with the business or financial institution, services or products associated with the customer, type of communication, whether it is the first time communicating with the customer, location where the customer's account was opened, and other information. Customer communication textbox 90 may display the text of an email from the customer or a transcription of the natural language audio input received from customer device 8, such as, for example, customer message 76 of FIG. 1. In the example illustrated, message 76 corresponds to the following query: "I would like to transfer all my funds from my savings and checking account to another bank. Can you assist me with the account closure process?"

As further shown in the example of FIG. 4A, suggestions column 84 may display live suggestions to a customer service representative. Suggestions column 84 may include UI elements such as "Predicted Call-in Topic" text box 96, which may display the one or more predicted topics illustrated in FIG. 2D, and may include, for example, one or more topic predictions 161, along with associated probabilities of such topics (e.g., as illustrated in FIG. 4A, and for the specific example shown, the probability for the "account" topic may "0.175," for the "process" topic may be "0.132," and for the "close" topic may be "0.102"). Suggestions column 84 may also display the one or more topic-based response recommendations output by recommendations module 16 during the live conversation. Specifically, suggestions column 84 may include "Suggested Key Words" text box 92, which may display one or more recommended keywords or expressions corresponding to a "do" recommendation 171, such as "issue," "thank," "investigate," "transfer," and "option." Suggestions column 84 may also include "Don't say" key words text box 94, which may display one or more not recommended keywords or expressions corresponding to a "not do" recommendation 171, such as "sorry," "close," "close account," "closure," and "reason." In some examples (not shown in FIG. 4A), rather than only displaying recommended keywords, phrases, or expressions, "Suggested Key Words" text box 92 may display a recommended response as a full sentence.

As shown in the example of FIG. 4A, response analysis column 86 may display "Bank Response Analysis" text box 98, which may display an initial response 78 (scc FIG. 2C) prepared by the agent. "Bank Response Analysis" text box 98 may display the response provided by the agent so that certain keywords included in the response may be highlighted in accordance with whether the keyword is included in one or more of the recommended keywords displayed by suggestions column 84, or included in one or more of the not recommended keywords displayed by suggestions column 84. Response analysis column 86 may also display customer happiness prediction bar chart 100, which may display the satisfaction score for response 78 predicted by prediction module 18 corresponding to prediction 181 described in connection with FIG. 2C. As shown in the example of FIG. 4A, "Bank Response Analysis" text box 98 displays the following text: "We are sorry to see you go. We will need to verify your identity and complete the necessary forms to close your accounts." As shown, the word "close" is highlighted as a "not do" word or expression in recommendation 171, as the word "close" may be associated with a tendency to result in an undesirable outcome for a given topic and/or may have been included in "Don't say" key words text box 94. Customer happiness prediction bar chart 100 further shows that the example response resulted in a predicted "Satisfy" score of 0.17 (e.g., corresponding to prediction 181), and, therefore, a predicted "Dissatisfy" score of 0.83. As such, the bank response displayed in FIG. 4A may be considered a less than optimal response. That is, the bank response may not meet the expectations of the customer, and result in an unsatisfactory customer experience. As further shown in the example of FIG. 4A, response analysis column 86 further includes "File Follow-up" button 102. In some examples, a customer service representative may interact with "File Follow-up" button 102 to initiate a follow-up communication with the customer, which may involve providing additional messages, offerings, or requests for additional information. As such, computer information system 14 may receive data from the customer after communication with the agent has ended, which may be more indicative of actual customer attrition and may help to detect weaknesses in computer information system 14, other computing systems, business operations, business policies or procedures, or otherwise.

Figure 4B:
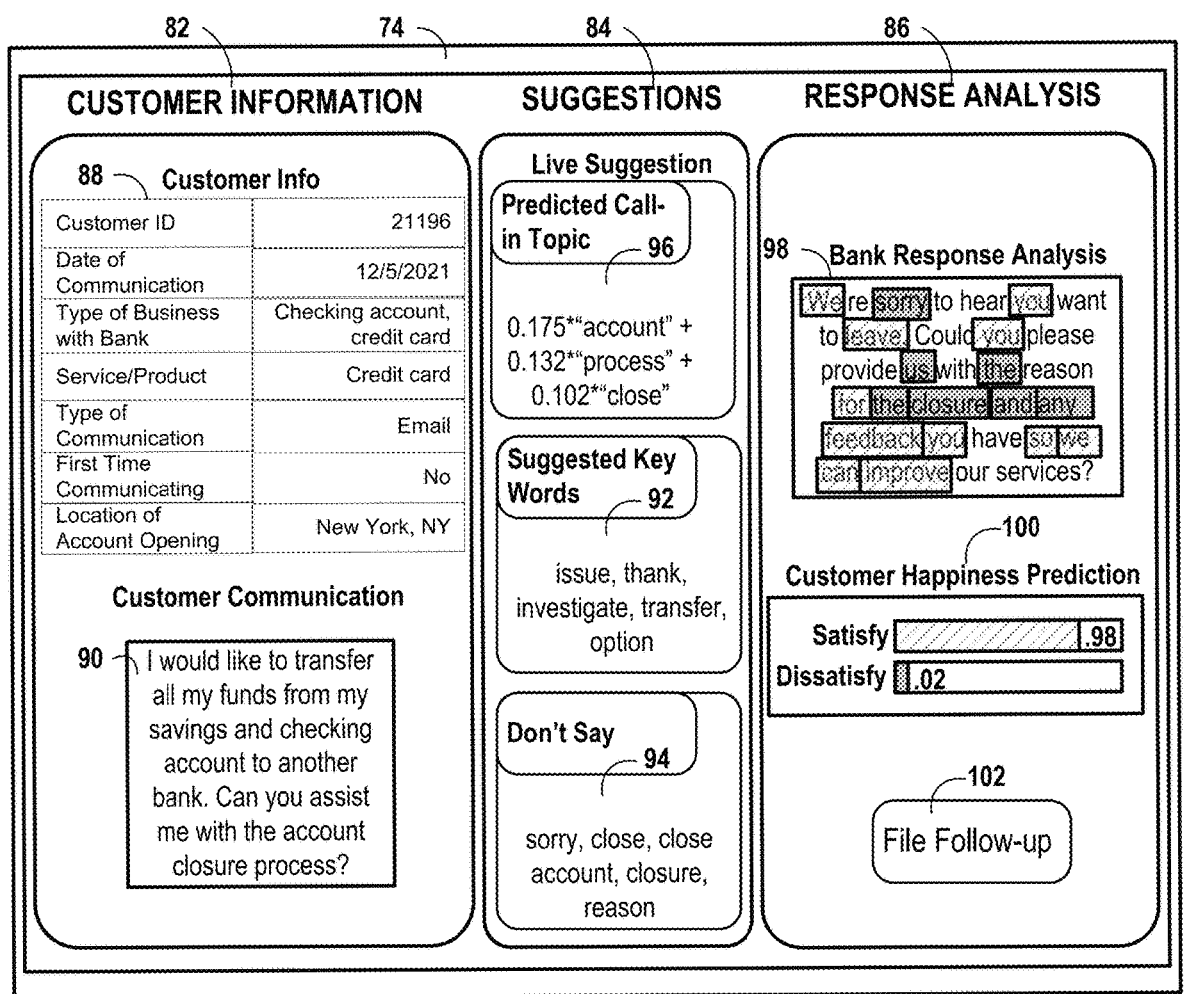
FIG. 4B is another conceptual diagram illustrating an example dashboard interface for displaying topic-based response recommendations, in accordance with one or more techniques of this disclosure.

FIG. 4B is another conceptual diagram illustrating an example dashboard interface for displaying topic-based response recommendations during a live conversation, in accordance with one or more techniques of this disclosure. The example of FIG. 4B includes another view of dashboard interface 74 of FIG. 4A, in which "Bank Response Analysis" text box 98 displays revised response 80 (see FIG. 2C): "We're sorry to hear you want to leave. Could you please provide us with the reason for the closure and any feedback you have so we can improve our services?" As shown, the words "we," "you," "leave," "for," "feedback," "so," "can," and "improve" are highlighted in accordance with a "do" recommendation 171, as those words are associated with a tendency to achieve the desired outcome and/or tend to result in higher customer satisfaction scores. Such words may be included in "Suggested Key Words" text box 92. The words "sorry," "us," "the," "closure," "and," and "any" are highlighted in accordance with a "Not Do" recommendation 171, as those words are associated with a tendency to achieve an undesirable outcome and/or tend to result in lower customer satisfaction scores. These words may be included in "Don't say" key words text box 94. As illustrated in at least FIG. 4B, the words highlighted in accordance with the "do" recommendation may be highlighted in a different visual appearance than the words highlighted in accordance with the "Not Do" recommendation. For example, different colors, patterns, shading, etc., may be used to visually distinguish between the two respective highlights.

In the example of FIG. 4B, customer happiness prediction bar chart 100 further shows that the example response resulted in a predicted "Satisfy" score of 0.98, and a predicted "Dissatisfy" score of 0.02 (e.g., on a scale of 0.0 to 1.0). As such, the bank response 80 displayed in FIG. 4B may be considered a more effective or favorable response (e.g., to provide a more satisfactory customer experience and meet the expectations of the customer). Information about responses 78 and 80 may be provided as feedback to the computing device, computing system, or information system for further analytics and/or model retraining.

Figure 5:
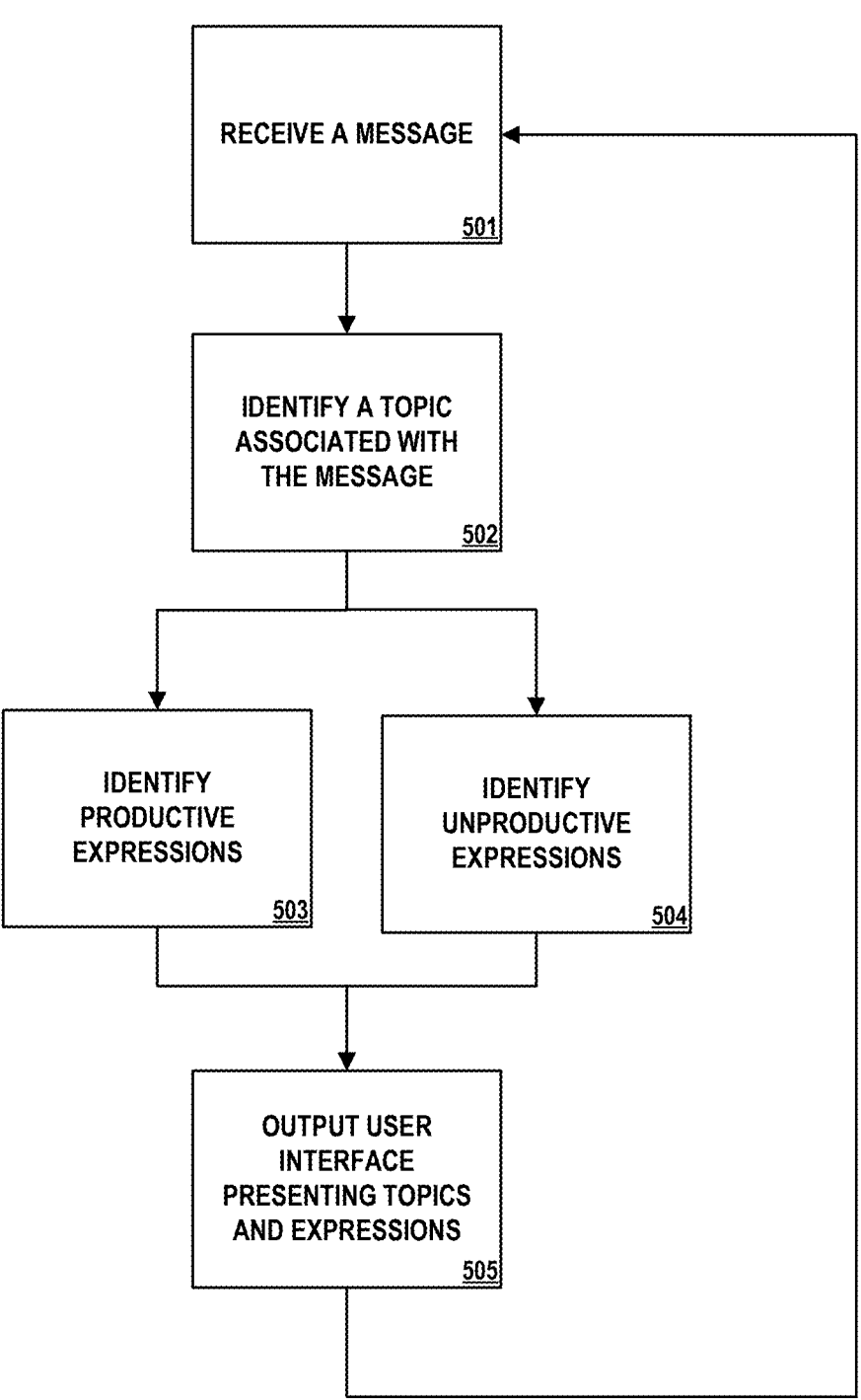
FIG. 5 is a flowchart illustrating an example process by which a system may generate topic-based response recommendations, in accordance with one or more techniques of this disclosure.

FIG. 5 is a flow diagram illustrating operations performed by an example computer information system 14 in accordance with one or more aspects of the present disclosure. FIG. 5 is described below within the context of computer information system 14 of FIG. 2B and FIG. 3. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, computer information system 14 may receive a message (501). For example, with reference to FIG. 2B and FIG. 3, preprocessing module 24 of computer information system 14 detects input that it determines corresponds to a message 76 from a customer (e.g., customer 9 operating customer device 8). Preprocessing module 24 processes the message to translate the message in a form suitable for input to topic prediction model 28 and/or do/not do recommendation models 30. As a result of such processing, preprocessing module 24 generates processed text 64.

Computer information system 14 may identify a topic associated with a message (502). Computer information system 14 outputs processed text 64 to topic prediction model 28. Topic prediction model 28 generates, based on topic prediction model 28, topic prediction 161.

Computer information system 14 may generate one or more productive expressions that, if communicated to the user device, tend to encourage a desired outcome (503). In addition, computer information system 14 may generate one or more unproductive expressions that, if communicated to the user device, tend to discourage the desired outcome (504). For example, computer information system 14 identifies which of the do/not do recommendation models 30 corresponds to the topic associated with topic prediction 161. Computer information system 14 presents processed text 64 to the identified do/not do recommendation model 30. The identified do/not do recommendation model 30 generates do/not do recommendations 171. Included in these do/not do recommendation 171 are one or more expressions that, if communicated to customer device 8, recommendation model 30 predicts will tend to encourage a desired outcome, such as customer 9 remaining a bank customer. Also included in these do/not do recommendation 171 are one or more expressions that, if communicated to customer device 8, recommendation model 30 predicts will discourage the desired outcome (i.e., such expressions will tend to discourage customer 9 from remaining a bank customer).

In some examples, generating productive expressions and unproductive expressions (e.g., by the identified recommendation model 30) is performed by the same model as part of one process. In other examples, generating productive expressions is performed by one model or as part of one process (503), while generating unproductive expressions is performed by another model and/or as part of a different process (504).

Computer information system 14 may output a user interface that presents the topic associated with the message, the productive expressions, and the unproductive expressions (505). For example, with reference to FIG. 2B and FIG. 3, computer information system 14 generates a user interface that includes topic prediction 161 and do/not do recommendations 171. Computer information system 14 outputs information sufficient to recreate the user interface at agent device 10. Agent device 10 receives the information and generates the user interface. Agent device 10 outputs the user interface for presentation to agent 11. In some examples, agent device 10 outputs the user interface to a display device associated with agent device 10, thereby presenting the user interface to agent 11.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., customer device 8, agent device 10, computer information system 14, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

The techniques described in this disclosure may be implemented, at least in part, in hardware, software, firmware or any combination thereof. For example, various aspects of the described techniques may be implemented within a processing system comprising one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A system comprising processing circuitry and a storage device, wherein the processing circuitry has access to the storage device and is configured to:

identify, based on text derived from a message originating from a user device, a topic associated with the message, wherein the topic is identified from a plurality of topics;

generate, based on the topic and the text derived from the message, one or more productive expressions that, if communicated to the user device, tend to encourage a desired outcome;

generate, based on the topic and the text derived from the message, one or more unproductive expressions that, if communicated to the user device, tend to discourage the desired outcome; and output a user interface that presents the topic associated with the message, the productive expressions, and the unproductive expressions, wherein to output the user interface, the processing circuitry is further configured to:

output the user interface to an agent device operated by an agent, receive input indicating a response to the message, and communicate, to the user device, the response.

2. The system of claim 1, wherein the processing circuitry is further configured to:

receive data representing the message from the user device; and preprocess the data representing the message to generate the text derived from the message.

3. The system of claim 2, wherein the data representing the message is an audio signal, and wherein to preprocess the data, the processing circuitry is further configured to:

convert the audio signal into the text by applying a natural language processing model to the audio signal.

4. The system of claim 1, wherein to identify the topic associated with the message, the processing circuitry is further configured to:

apply a latent Dirichlet allocation model to the text associated with the message.

5. The system of claim 1, wherein to generate the one or more productive expressions, the processing circuitry is further configured to:

choose, based on the identified topic, a machine learning model from a plurality of topic-based machine learning models, wherein each of the topic-based machine learning models are associated with a different one of the plurality of topics; and apply the chosen machine learning model to the text derived from the message.

6. The system of claim 1, wherein to generate the one or more productive expressions and to generate the one or more unproductive expressions, the processing circuitry is further configured to:

choose, based on the identified topic, a machine learning model from a plurality of topic-based machine learning models, wherein each of the topic-based machine learning models are associated with a different one of the plurality of topics; and apply the chosen machine learning model to the text derived from the message.

7. The system of claim 1, wherein to receive input indicating the response, the processing circuitry is further configured to:

receive a proposed response from the agent device; and apply a deep learning model to predict, based on the message and the proposed response, a predicted likelihood of achieving the desired outcome.

8. The system of claim 7, wherein to receive input indicating the response, the processing circuitry is further configured to:

output a feedback user interface to the agent device that presents the predicted likelihood of achieving the desired outcome, wherein the feedback user interface further indicates which words in the proposed response tend to encourage the desired outcome and which words in the proposed response tend to discourage the desired outcome; and receive the response from the agent device, wherein the response is a modification of the proposed response generated based on the feedback user interface.

9. The system of claim 1, wherein the processing circuitry is further configured to:

retrain, based on the message and the response, at least one machine learning model from a plurality of topic-based machine learning models.

10. The system of claim 1, wherein the system is operated by a bank, wherein the user device is operated by a user that is a customer of the bank, and wherein the desired outcome is the bank retaining the user as a customer of the bank.

11. The system of claim 1, wherein the processing circuitry is further configured to:

receive a plurality of historical messages and responses, each labeled to indicate whether the desired outcome was achieved; and apply a classification model to generate, based on the plurality of historical messages and responses, a set of expressions associated with the desired outcome being achieved and a set of topics and expressions associated with the desired outcome not being achieved.

12. A method comprising:

identifying, by a system and based on text derived from a message originating from a user device, a topic associated with the message, wherein the topic is identified from a plurality of topics;

generating, by the system and based on the topic and the text derived from the message, one or more productive expressions that, if communicated to the user device, tend to encourage a desired outcome;

generating, by the system and based on the topic and the text derived from the message, one or more unproductive expressions that, if communicated to the user device, tend to discourage the desired outcome; and outputting, by the system, a user interface that presents the topic associated with the message, the productive expressions, and the unproductive expressions, wherein outputting the user interface includes:

outputting, by the system, the user interface to an agent device operated by an agent, receiving, by the system, input indicating a response to the message, and communicating, by the system and to the user device, the response.

13. The method of claim 12, wherein the method further comprises:

receiving, by the system, data representing the message from the user device; and preprocessing, by the system, the data representing the message to generate the text derived from the message.

14. The method of claim 13, wherein the data representing the message is an audio signal, and wherein preprocessing the data includes:

converting the audio signal into the text by applying a natural language processing model to the audio signal.

15. The method of claim 12, wherein identifying the topic associated with the message includes:

applying a latent Dirichlet allocation model to the text associated with the message.

16. The method of claim 12, wherein generating the one or more productive expressions includes:

choosing, based on the identified topic, a machine learning model from a plurality of topic-based machine learning models, wherein each of the topic-based machine learning models are associated with a different one of the plurality of topics; and applying the chosen machine learning model to the text derived from the message.

17. The method of claim 12, wherein generating the one or more productive expressions and generating the one or more unproductive expressions includes:

choosing, based on the identified topic, a machine learning model from a plurality of topic-based machine learning models, wherein each of the topic-based machine learning models are associated with a different one of the plurality of topics; and applying the chosen machine learning model to the text derived from the message.

18. Non-transitory computer-readable media comprising instructions that, when executed, cause processing circuitry of a system to:

identify, based on text derived from a message originating from a user device, a topic associated with the message, wherein the topic is identified from a plurality of topics;

generate, based on the topic and the text derived from the message, one or more productive expressions that, if communicated to the user device, tend to encourage a desired outcome;

generate, based on the topic and the text derived from the message, one or more unproductive expressions that, if communicated to the user device, tend to discourage the desired outcome; and output a user interface that presents the topic associated with the message, the productive expressions, and the unproductive expressions, wherein to output the user interface, the instructions further cause the processing circuitry to:

output the user interface to an agent device operated by an agent, receive input indicating a response to the message, and communicate, to the user device, the response.

* * * * *